United States Patent
Lee et al.

(10) Patent No.: US 10,910,896 B2
(45) Date of Patent: Feb. 2, 2021

(54) ROTOR AND MOTOR COMPRISING SAME

(71) Applicant: LG INNOTEK CO., LTD., Seoul (KR)

(72) Inventors: Jung Kyu Lee, Seoul (KR); Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 224 days.

(21) Appl. No.: 16/081,760

(22) PCT Filed: Feb. 28, 2017

(86) PCT No.: PCT/KR2017/002198
§ 371 (c)(1),
(2) Date: Aug. 31, 2018

(87) PCT Pub. No.: WO2017/150886
PCT Pub. Date: Sep. 8, 2017

(65) Prior Publication Data
US 2020/0136447 A1 Apr. 30, 2020

(30) Foreign Application Priority Data

Mar. 2, 2016 (KR) .................. 10-2016-0025263
Mar. 2, 2016 (KR) .................. 10-2016-0025265

(51) Int. Cl.
*H02K 1/28* (2006.01)
*H02K 1/27* (2006.01)
(Continued)

(52) U.S. Cl.
CPC .............. *H02K 1/278* (2013.01); *H02K 1/30* (2013.01); *H02K 21/14* (2013.01)

(58) Field of Classification Search
CPC ............ H02K 1/278; H02K 1/27; H02K 1/28; H02K 16/02
See application file for complete search history.

(56) References Cited

U.S. PATENT DOCUMENTS 7,638,913 B2 * 12/2009 Ionel .................... H02K 1/2726
310/112
9,257,874 B2 * 2/2016 Haga ...................... H02K 1/278
(Continued)

FOREIGN PATENT DOCUMENTS

CN      103339830 A    10/2013
JP       6-153428 A     5/1994
(Continued)

*Primary Examiner* — Dang D Le
(74) *Attorney, Agent, or Firm* — Birch, Stewart, Kolasch & Birch, LLP (57) ABSTRACT

One embodiment discloses a rotor and a motor including the same. The rotor includes a first rotor part and a second motor part arranged in an axial direction. Further, the first rotor part includes a first rotor core, multiple first magnets arranged on the outer circumferential surface of the first rotor core, and a first holder for fixing the multiple first magnets, and the second rotor part includes a second rotor core, multiple second magnets arranged on the outer circumferential surface of the second rotor core, and a second holder for fixing the multiple second magnets. In addition, the first holder includes multiple first protruding parts protruding towards the second rotor part, and the second holder includes multiple second protruding parts protruding towards the first rotor part. Further, a gap is formed between the first rotor core and the second rotor core.

20 Claims, 7 Drawing Sheets

(51) Int. Cl.
*H02K 1/30* (2006.01)
*H02K 21/14* (2006.01)

(56) References Cited

U.S. PATENT DOCUMENTS

| | | |
|---|---|---|
| 2010/0164422 A1 | 7/2010 | Shu et al. |
| 2011/0291498 A1 | 12/2011 | Sakata et al. |
| 2013/0257211 A1 | 10/2013 | Haga et al. |

FOREIGN PATENT DOCUMENTS

| | | |
|---|---|---|
| JP | 6-225486 A | 8/1994 |
| JP | 2010-154699 A | 7/2010 |
| JP | 2012-222835 A | 11/2012 |
| WO | WO 2010/090303 A1 | 8/2010 |

* cited by examiner

ROTOR AND MOTOR COMPRISING SAME

CROSS REFERENCE TO RELATED APPLICATIONS

This application is the National Phase of PCT international Application No. PCT/KR2017/002198, filed on Feb. 28, 2017, which claims priority under 35 U.S.C. 119(a) to Patent Application Nos. 10-2016-0025263, filed in Republic of Korea on Mar. 2, 2016 and 10-2016-0025265, filed in Republic of Korea on Mar. 2, 2016, all of which are hereby expressly incorporated by reference into the present application.

TECHNICAL FIELD

The present invention relates to a rotor and a motor including the same.

BACKGROUND ART

A motor generates power while a rotor is rotated by an electromagnetic interaction between magnets of the rotor and coils of a stator.

A motor includes a housing, a stator, a rotor, and a rotating shaft. The rotor includes a plurality of magnets. The rotor may be classified into an interior permanent magnet (IPM) type rotor in which magnets are inserted into rotor cores and a surface permanent magnet (SPM) type rotor in which magnets are attached onto surfaces of rotor cores.

In the SPM type rotor, a plurality of magnets are attached onto surfaces of rotor cores and a steel use stainless (SUS)-based cover is used for protecting the magnets. In a process of attaching the magnets, external surfaces of the rotor cores are coated with an adhesive, the magnets are attached to the rotors, and the adhesive is cured. Next, in a cover assembly process, an adhesive is applied onto the magnets, the magnets are covered by the cover, and the adhesive is cured. However, these processes are very complex, and use of the adhesive and the cover raises a material cost.

Technical Problem

The present invention is directed to providing a rotor capable of being easily assembled and a motor including the same.

In addition, the present invention is also directed to providing a rotor and a motor which are capable of fixing a magnet without an adhesive.

In addition, the present invention is also directed to providing a rotor with a reduced weight and a motor including the same.

In addition, the present invention is also directed to providing a rotor with a reduced cost and a motor including the same.

Objectives to be solved by the present invention will not be limited to the above-described objectives, and objectives which are not described above will be clearly understood by those skilled in the art from the following specification.

Technical Solution

One aspect of the present invention provides a rotor including a first rotor part and a second rotor part disposed in a shaft direction, wherein the first rotor part includes a first rotor core, a plurality of first magnets disposed on an outer circumferential surface of the first rotor core, and a first holder configured to fix the plurality of first magnets, and the second rotor part includes a second rotor core, a plurality of second magnets disposed on an outer circumferential surface of the second rotor core, and a second holder configured to fix the plurality of second magnets, wherein the first holder includes a plurality of first protrusion parts protruding toward the second rotor part, and the second holder includes a plurality of second protrusion parts protruding toward the first rotor part, and wherein a gap is formed between the first rotor core and the second rotor core.

The gap may be in a range of 0.7 mm to 1.5 mm.

The first protrusion part and the second protrusion part may be alternately disposed in a radial direction of the rotor.

The first holder may include: a first body in a cylindrical shape; a first plate which is connected to the first body and has an annular shape configured to cover an upper surface of the first magnet; and a plurality of first coupling protrusions which protrude from an inner circumferential surface of the first body and are coupled to the first rotor core, wherein the first protrusion part may protrude from a bottom surface of the first coupling protrusion in the shaft direction.

The first coupling protrusion may include a coupling part coupled to the outer circumferential surface of the first rotor core and an extension part which connects the coupling part and the first body and fixes the first magnet.

The first protrusion part may support the second magnet, and the second protrusion part may support the first magnet.

The first plate may include at least one insertion protrusion to be coupled to an upper surface of the first rotor core, and the insertion protrusion is inserted into a coupling hole formed in the first rotor core.

A distance between the inner circumferential surface and an outer circumferential surface of the first body may decrease toward a central position between the adjacent first coupling protrusions.

The first coupling protrusion may include a through hole formed from the bottom surface of the first coupling protrusion in the shaft direction.

Each of the first magnet and the second magnet may include one surface facing the outer circumferential surface of each of the first rotor core and the second rotor core, the other surface facing the one surface, and a plurality of side surfaces connecting the one surface and the other surface, each of the plurality of side surfaces may include a first side surface and a second side surface which are parallel to the shaft direction and a third side surface and a fourth side surface which are perpendicular to the shaft direction, and any one of the first side surface and the second side surface may have a curvature.

Another aspect of the present invention provides a motor including: a housing; a stator disposed in the housing; a rotor having one or more features of the above-described rotor; and a rotating shaft passing through a center of the rotor.

The gap may be greater than a distance between an outer diameter of the first magnet and the inner circumferential surface of the stator.

Advantageous Effects

According to embodiments of the present invention, a rotor assembly process can be simplified.

In addition, a weight of a rotor can be reduced, and a cost thereof can be reduced.

A variety of useful advantages and effects are not limited to the above-described contents and will be more easily understood when specific embodiments of the present invention are described.

MODES OF THE INVENTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes at least one or combinations of the associated listed items.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when in a case in which one element is described as being formed on (or under) another element, such a description may include a case in which the one element is formed at an upper side or a lower side with respect to another element.

Example embodiments of the invention will be described below in more detail with reference to the accompanying drawings. Those components that are the same or are corresponding are rendered the same reference numeral regardless of the figure number, and redundant explanations are omitted.

Figure 1:
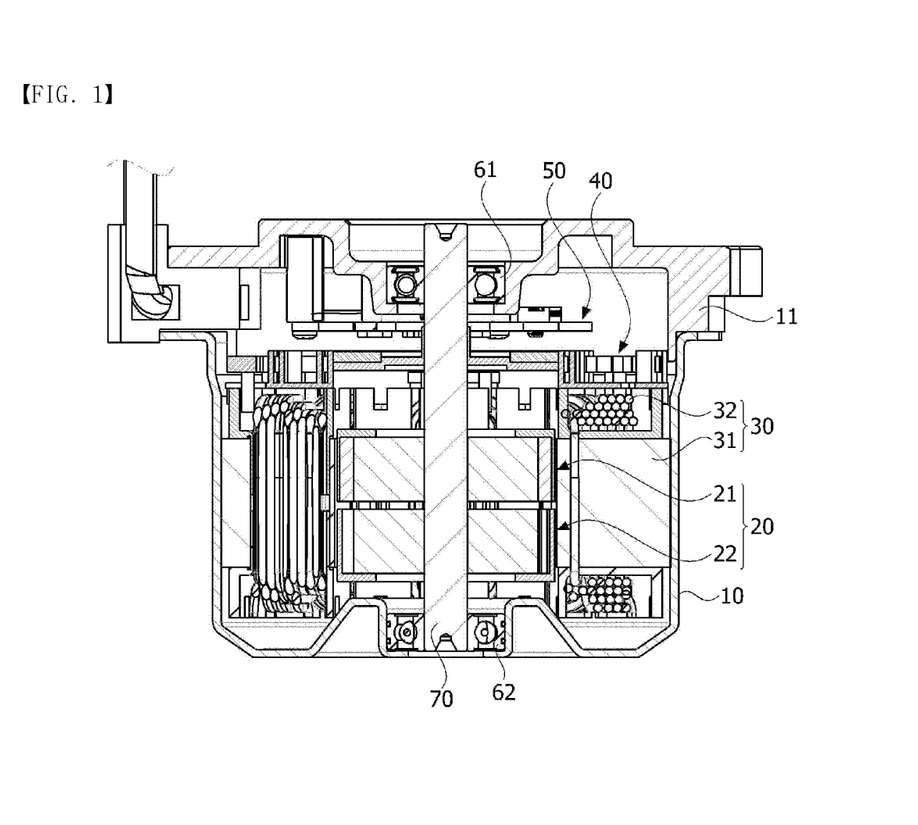
FIG. 1 is a conceptual view illustrating a motor according to an embodiment of the present invention motor.

FIG. 1 is a conceptual view illustrating a motor according to an embodiment of the present invention motor.

Referring to FIG. 1, the motor according to the embodiment of the present invention includes a housing 10 in which a stator 30, a rotor 20, and a rotating shaft 70 are disposed.

The housing 10 may accommodate the stator 30 and the rotor 20. The housing 10 may further include a cooling structure (not shown) to easily dissipate internal heat. The cooling structure may be selected from an air cooling structure and a water cooling structure, but the present invention is not limited thereto.

The stator 30 may be disposed in an inner space of the housing 10. The stator 30 may include stator cores 31 and coils 32 wound around the stator cores 31.

The stator 30 may be manufactured using the coils 32 wound around the stator cores 31 which are integrally formed, or using the coils wound around the plurality of divided stator cores and assembled in a cylindrical shape.

Busbars 40 may be electrically connected to the coils 32 wound around the stator 30 and include a plurality of terminals for connecting U-, V-, and W-phases. Power terminals of the busbar 40 may be exposed to the outside and electrically connected to an external power source or inverter.

The rotor 20 may be disposed to be rotatable with respect to the stator 30. The rotor 20 may be disposed inside the stator 30. The rotor 20 may include a first rotor part 21 and a second rotor part 22 which are disposed in a shaft direction (a longitudinal direction of the rotating shaft). The first rotor part 21 and the second rotor part 22 may include rotor cores, magnets, and holders.

The rotating shaft 70 may be coupled to a center of the rotor 20. Accordingly, the rotor 20 may rotate with the rotating shaft 70. The rotating shaft 70 may be supported by a first bearing 61 disposed at one side of the rotating shaft 70 and a second bearing 62 disposed on the other side thereof.

A sensing plate 50 for obtaining position information of the rotor cores may be disposed above the rotor 20, but the present invention is not limited thereto, and a similar detection device for obtaining the position information may be installed thereabove.

For example, the motor according to the embodiment may be an electric power steering (EPS) motor used for an EPS system. Specifically, in the EPS system, an electronic control unit (ECU) may control an inverter to drive the motor according to a traveling condition detected by a speed sensor, a torque angle sensor, a torque sensor, etc. The motor according to the embodiment may be driven by three-phase power supplied by the inverter. However, the motor according to the embodiment is not limited thereto.

Figure 2:
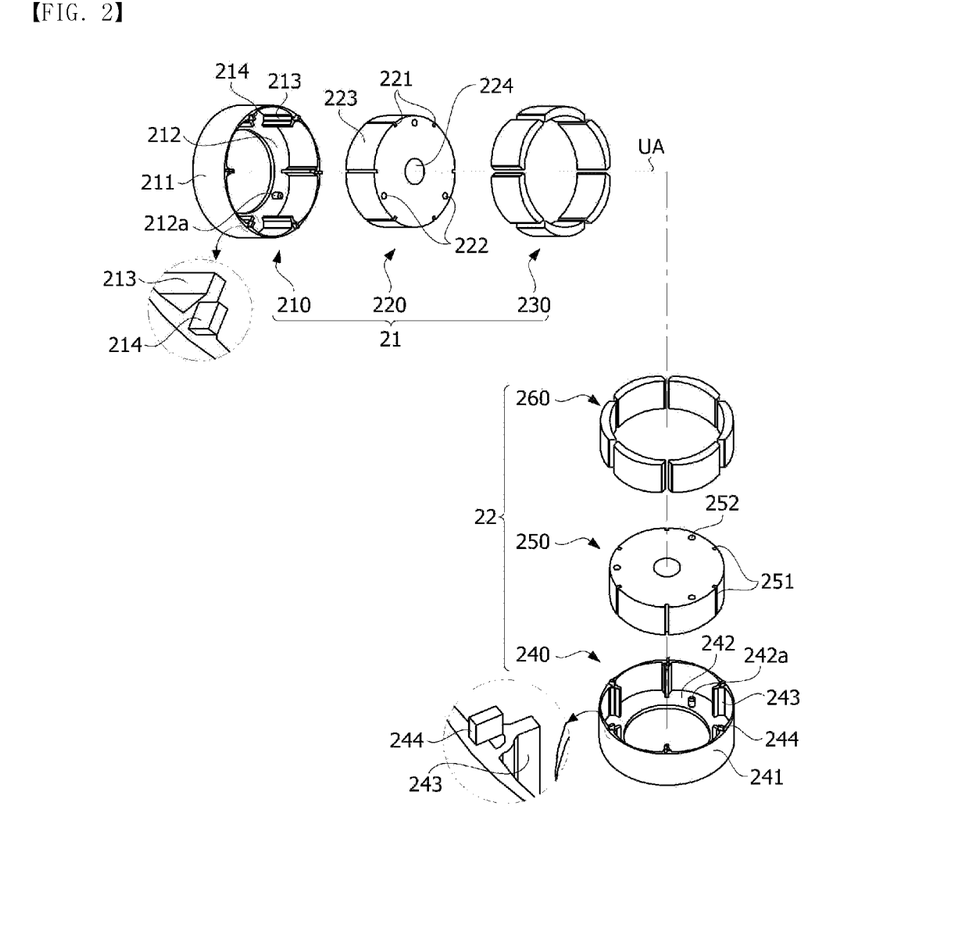
FIG. 2 is an exploded perspective view illustrating a rotor according to the embodiment of the present invention.
Figure 3A:
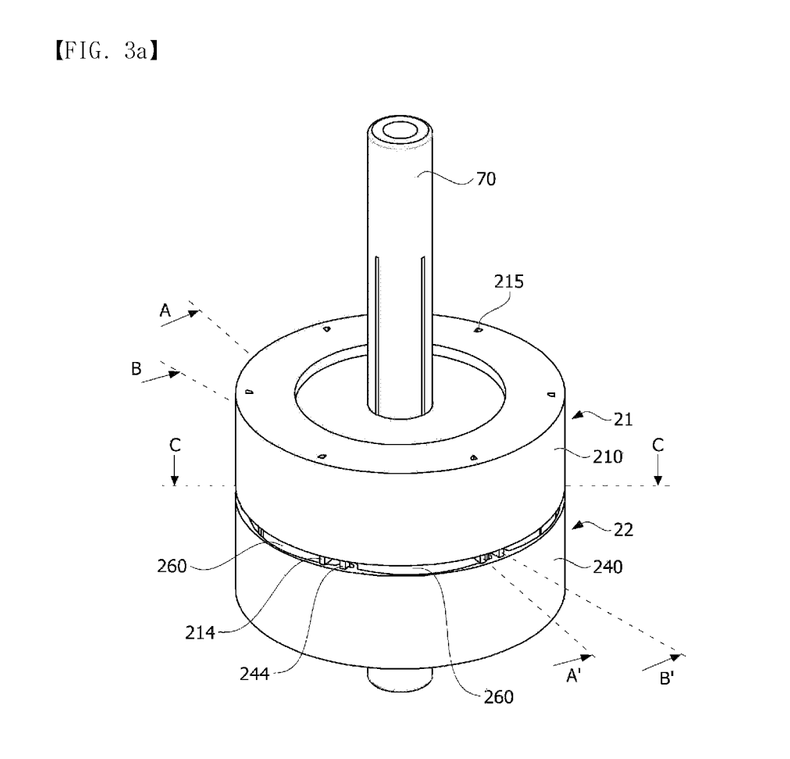
FIG. 3A is a view illustrating a coupled state of the rotor and a rotating shaft according to the embodiment of the present invention.
Figure 3B:
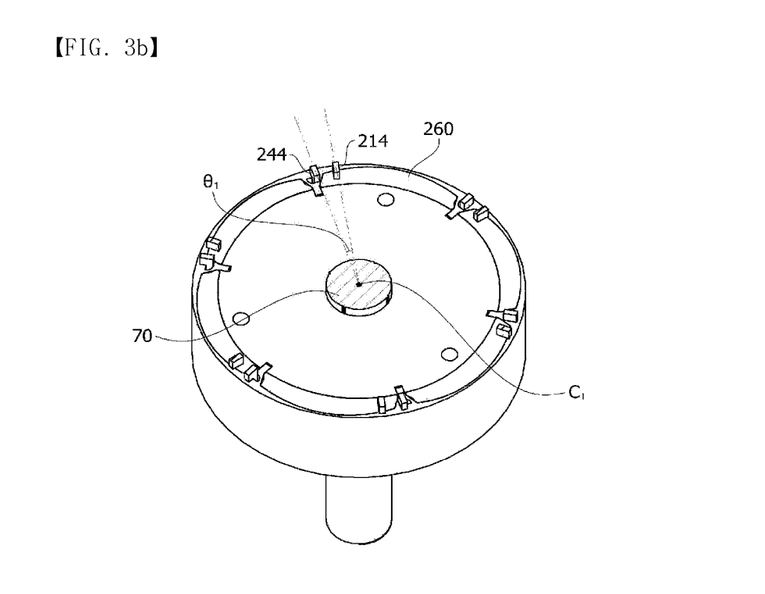
FIG. 3B is a cross-sectional view taken along line C-C' of FIG. 3A.

FIG. 2 is an exploded perspective view illustrating a rotor according to the embodiment of the present invention, FIG. 3A is a view illustrating a coupled state of the rotor and a rotating shaft according to the embodiment of the present invention, and FIG. 3B is a cross-sectional view taken along line C-C' of FIG. 3A.

Referring to FIG. 2, the rotor 20 according to the embodiment includes the first rotor part 21 and the second rotor part 22 which are disposed in the shaft direction UA. The first rotor part 21 and the second rotor part 22 may respectively include rotor cores 220 and 250, a plurality of magnets 230 and 260, and holders 210 and 240 configured to fix the magnets 230 and 260. The first rotor part 21 and the second rotor part 22 may be formed of the same component and may face each other.

The first rotor part 21 may include a first rotor core 220, a plurality of first magnets 230 disposed on an outer circumferential surface of the first rotor core 220, and a first holder 210 configured to fix the plurality of first magnets 230.

The first rotor core 220 may have a cylindrical shape and include a plurality of slits 221 formed in the shaft direction. The magnets 230 are disposed in regions 223 divided by the plurality of slits 221. The first rotor core 220 may be manufactured using a plurality of metal plates stacked in the shaft direction. A central hole 224 and coupling holes 222 may be formed in the first rotor core 220 in the shaft direction.

The first holder 210 may include a first body 211 having a hollow cylindrical shape, a first plate 212 connected to the first body 211 and having an annular shape, a plurality of first coupling protrusions 213 protruding from an inner circumferential surface of the first body 211 and coupled to the first rotor core 220, and first protrusion parts 214 protruding from bottom surfaces of the first coupling protrusions 213 in the shaft direction.

The first protrusion part 214 may be defined as a portion protruding from an end of the first body 211 in the shaft direction. That is, the first protrusion parts 214 may protrude toward the second rotor part 22. Insertion protrusions 212a inserted into the coupling holes 222 of the first rotor core 220 may be formed in an inner surface of the first plate 212. The first plate 212 may cover upper surfaces of the first magnets 230 exposed in the shaft direction. A hole may be formed at a center of the first plate 212.

The second rotor part 22 includes a second rotor core 250, a plurality of second magnets 260 disposed on an outer circumferential surface of the second rotor core 250, and a second holder 240 configured to fix the plurality of second magnets 260. The second holder 240 may include a second body 241 having a hollow cylindrical shape, a second plate 242 connected to the second body and having an annular shape, a plurality of second coupling protrusions 243 protruding from an inner circumferential surface of the second body 241 and coupled to the second rotor core 250, and second protrusion parts 244 protruding from bottom surfaces of the second coupling protrusions 243 in the shaft direction. The second protrusion parts 244 may protrude toward the first rotor part 21.

Since the first rotor part 21 and the second rotor part 22 are formed of the same component and face each other, a structure of the second rotor part 22 may be the same as that of the first rotor part 21.

Referring to FIGS. 3A and 3B, the first rotor part 21 and the second rotor part 22 may be fixedly pressed against the rotating shaft 70. Here, the second rotor part 22 may rotate at a predetermined angle with respect to the first rotor part 21 in a circumferential direction and may be coupled to the first rotor part 21. Therefore, the first protrusion part 214 and the second protrusion part 244 are alternately disposed in a radial direction, and thus a gap between the first rotor part 21 and the second rotor part 22 may be fixed.

The first protrusion part 214 of the first rotor part 21 may be disposed on the magnet 260 of the second rotor part 22. Similarly, the second protrusion part 244 of the second rotor part 22 may be disposed on the magnet 230 of the first rotor part 21.

Here, an angle $\theta_1$ between the first protrusion part 214 and the second protrusion part 244 with respect to a center of the rotating shaft 70 may be in the range of 2° to 10°. In a case in which the angle is less than 2°, the second protrusion part 244 may not support the magnet 230 in the shaft direction, and in a case in which the angle is greater than 10°, a skew angle is large so that rotation of the rotor may not be smooth.

Figure 4:
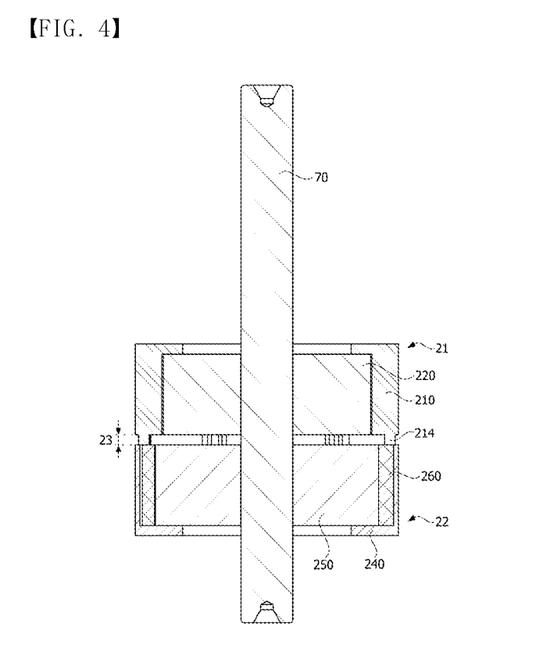
FIG. 4 is a cross-sectional view taken along line A-A' of FIG. 3A.
Figure 5:
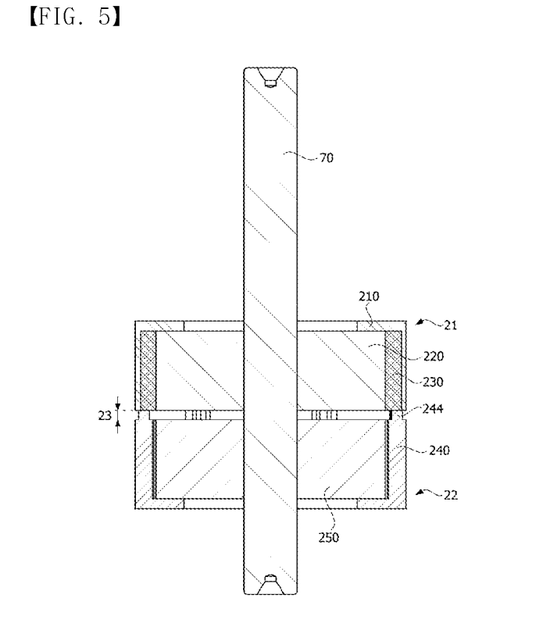
FIG. 5 is a cross-sectional view taken along line B-B' of FIG. 3A.
Figure 6:
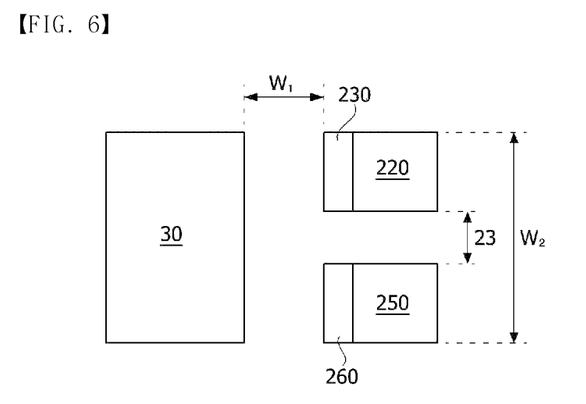
FIG. 6 is a view for describing a gap between a first rotor and a second rotor.

FIG. 4 is a cross-sectional view taken along line A-A' of FIG. 3A, FIG. 5 is a cross-sectional view taken along line B-B' of FIG. 3A, and FIG. 6 is a view for describing a gap between a first rotor and a second rotor.

Referring to FIG. 4, the first protrusion part 214 of the first holder 210 protrudes toward the second rotor part 22, and referring to FIG. 5, the second protrusion part 244 of the second holder 240 protrudes toward the first rotor part 21. Accordingly, a gap 23 may be formed between the first rotor core 220 and the second rotor core 250, and a gap 23 may be formed between the first magnet 230 and the second magnet 260. According to the above-described configuration, an air gap is formed between the first magnet 230 and the second magnet 260 so that magnetic characteristics can be improved. In addition, the rotor core may have a thickness decreased by a thickness corresponding to the gap 23 so that a cost can be reduced.

The first protrusion part 214 of the first holder 210 may be in contact with an upper end of the second magnet 260, and the second protrusion part 244 of the second holder 240 may be in contact with a lower end of the first magnet 230. Accordingly, the first magnet 230 and the second magnet 260 can be prevented from moving away in the shaft direction.

Referring to FIG. 6, the first gap 23 between the first rotor part 21 and the second rotor part 22 may be greater than or equal to a first distance W1 between the first and second magnets 230 and 260 and an inner circumferential surface of the stator 30. In a case in which the first distance W1 between the first and second magnets 230 and 260 and the inner circumferential surface of the stator 30 is 0.7 mm, the first gap 23 between the first rotor part 21 and the second rotor part 22 may be in the range of 0.7 mm to 1.5 mm.

In a case in which the first gap 23 is less than 0.7 mm, the first gap 23 is less than a distance between an outer diameter of the first and second magnets 230 and 260 and the stator 30, and thus there is a problem in that a magnetic force may be leaked, and in a case in which the first gap 23 is greater than 1.5 mm, a total height W2 of the first and the second magnets 230 and 260 is greater than that of the stator, and thus magnetic line loss may occur. Accordingly, a ratio between the first distance W1 and the first gap 23 may be in the range of 1:1 to 1:2.1.

Figure 7:
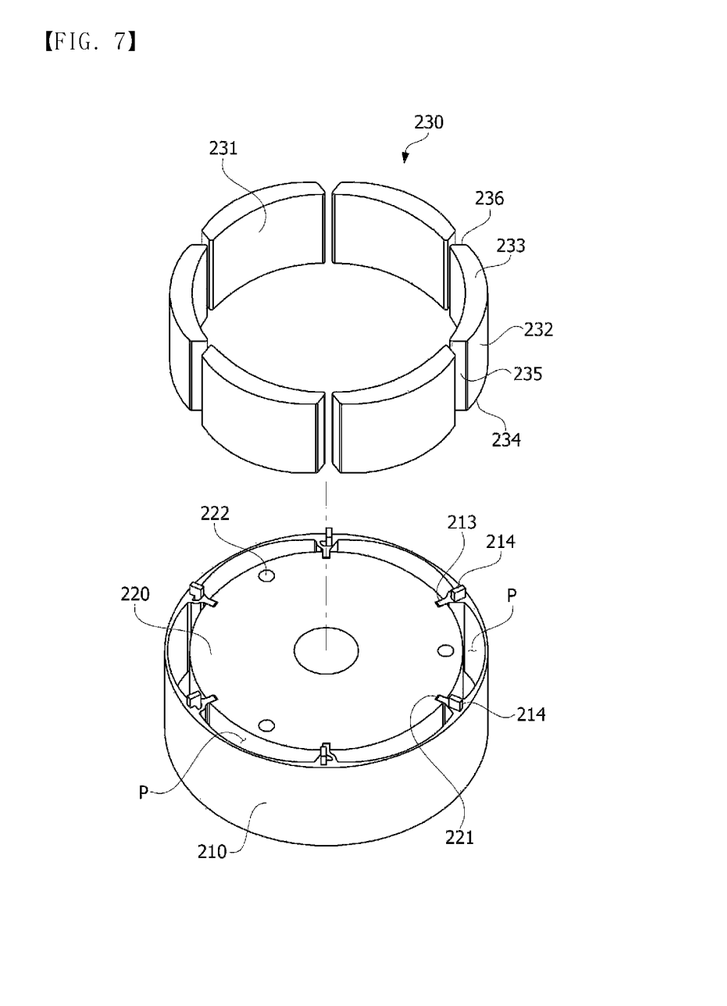
FIG. 7 is a view showing a state of a magnet being inserted into the rotor.
Figure 8:
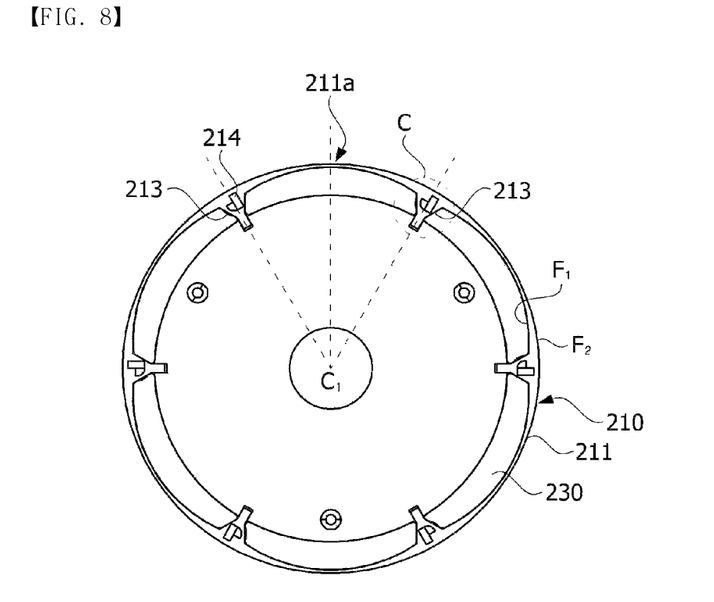
FIG. 8 is a plan view of FIG. 7.
Figure 9:
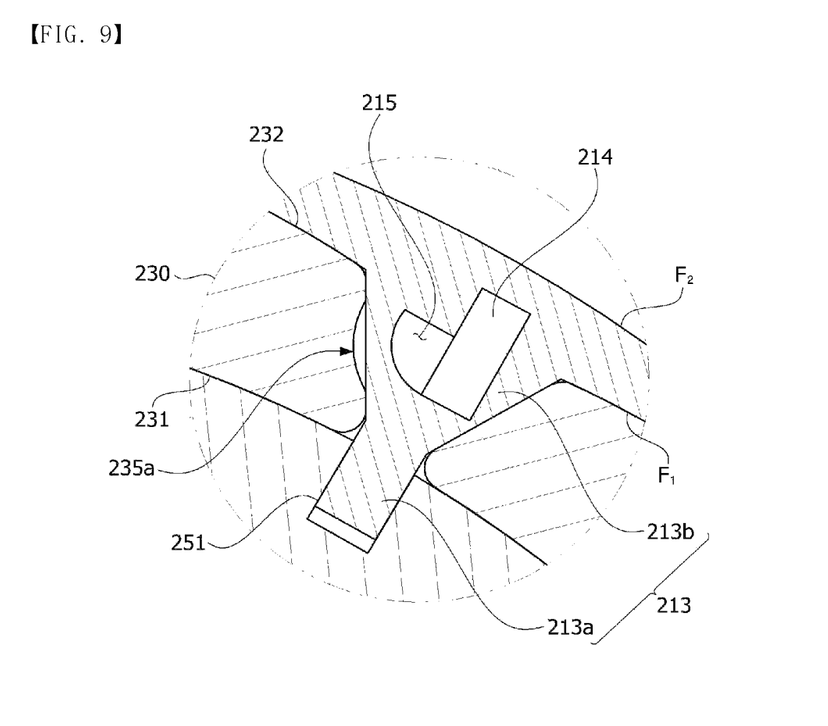
FIG. 9 is an enlarged view illustrating portion C of FIG. 8.

FIG. 7 is a view showing a state of a magnet being inserted into the rotor, FIG. 8 is a plan view of FIG. 7, and FIG. 9 is an enlarged view illustrating portion C or FIG. 8. Hereinafter, the first rotor part will be described mainly, but the description will also be clearly applied to the second rotor part.

Referring to FIG. 7, the cylindrical shaped first holder 210 is coupled to the first rotor core 220 to form pockets P into which the first magnets 230 are inserted. Conventionally, a magnet is attached to an outer circumferential surface of a rotor core using an adhesive, and is covered by a SUS material using an adhesive, but such a structure has a problem in that a process and manufacturing cost is high.

According to the embodiment, since the first magnets 230 are inserted into the pockets P formed by the first holder 210 coupled to the first rotor core 220, an adhesive for fixing the first magnet 230 may be unnecessary.

In addition, as the first holder 210 is formed by injection molding a resin, a cost can be reduced, and since the first coupling protrusion 213 of the first holder 210 is coupled to the slit 221 of the first rotor core 220, an additional adhesive may be unnecessary.

The first magnet 230 includes one surface 231 facing the outer circumferential surface of the first rotor core 220, the other surface 232 facing the one surface 231, and a plurality of side surfaces 233, 234, 235, and 236 connecting the one surface 231 and the other surface 232. The plurality of side surfaces 233, 234, 235, and 236 include the first side surface 235 and the second side surface 236 which are parallel to the shaft direction, and the third side surface 233 and the fourth side surface 234 which are perpendicular to the shaft direction. A curvature of the one surface 231 may be different from that of the other surface 232. Accordingly, a virtual circle in which one surface 231 extends may be greater than a virtual circle in which the other surface 232 extends.

Since the remaining surfaces of the first magnet 230 except the third side surface 233 are inserted into the pocket P, the first magnet 230 may be firmly inserted into the pocket P without an adhesive. In addition, a corrosion prevention effect can also be improved. The first magnet 230 and the pocket P may be designed such that a gap is not formed therebetween.

Referring to FIG. 8, in the first body 211 of the first holder 210, the plurality of first coupling protrusions 213 may protrude from an inner circumferential surface F1 toward a center C1, a distance between the inner circumferential surface F1 and an outer circumferential surface F2 of the first body 211 may decrease toward a central position 211a between the adjacent first coupling protrusions 213. A thickness of the central position 211a may be in the range of about 0.1 mm to 0.5 mm or may be 0.3 mm.

Referring to FIG. 9, the first coupling protrusion 213 may include a coupling part 213a coupled to the outer circumferential surface of the first rotor core 220 and an extension part 213b connecting the coupling part 213a and the first body 211. A thickness of the extension part 213b may decrease from the inner circumferential surface F1 of the first body 211 toward the coupling part 213a.

The first coupling protrusion 213 may include a through hole 215 passing therethrough from the bottom surface thereof in the shaft direction. In a process in which the first magnet 230 is inserted into the pocket, excessive stresses of the first magnet and/or pocket may occur. The through hole 215 may absorb the stresses occurring at the first magnet 230 and/or pocket. A shape of the through hole 215 may be changed while the stresses are absorbed. The first protrusion part 214 may be disposed to be adjacent to the through hole 215.

The side surface of the first magnet 230 may include a groove 235a which is concave from one surface 231 toward the other surface 232. Accordingly, a side surface of the first magnet may have a section which is not in contact with the extension part 213b. According to the above-described configuration, the stresses occurring during insertion of the first magnet 230 can be further reduced.

Figure 10:
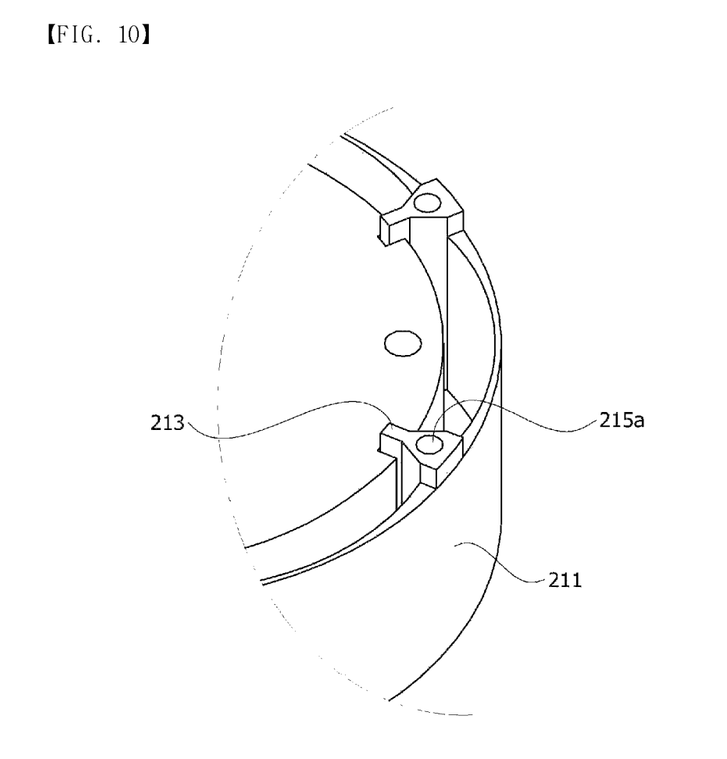
FIG. 10 is a view illustrating a modified embodiment of a holder.

The structures of the first protrusion part and the through hole 215 may be variously changed. Referring to FIG. 10, the through hole 215a may also be formed in the bottom surface of the first coupling protrusion 213, and the first coupling protrusion 213 may also protrude in the shaft direction to serve as the first protrusion part.

Referring to FIGS. 2, 4, and 7, in a method of manufacturing a rotor according to the embodiment, first, a resin may be injection-molded to form the first holder 210, and the first rotor core 220 may be installed in the first holder 210 to form the plurality of pockets P. Next, the first magnets 230 may be inserted into the plurality of pockets P to assemble the first rotor part 21.

The second rotor part 22 may also be assembled by the same method as that of the first rotor part 21. Next, the rotating shaft 70 may be fixedly inserted into the first rotor part 21 and the second rotor part 22. Here, as described above, the first gap 23 may be formed between the first rotor part 21 and the second rotor part 22 due to the first protrusion part 214 and the second protrusion part 244.

The invention claimed is:

1. A rotor comprising a first rotor part and a second rotor part which are disposed in a shaft direction,
   wherein the first rotor part includes a first rotor core, a plurality of first magnets disposed on an outer circumferential surface of the first rotor core, and a first holder configured to fix the plurality of first magnets, and
   the second rotor part includes a second rotor core, a plurality of second magnets disposed on an outer circumferential surface of the second rotor core, and a second holder configured to fix the plurality of second magnets,
   wherein the first holder includes a plurality of first protrusion parts protruding toward the second rotor part, and
   the second holder includes a plurality of second protrusion parts protruding toward the first rotor part,
   wherein a gap is formed between the first rotor core and the second rotor core by the plurality of first protrusion parts and the plurality of second protrusion parts,
   wherein the first holder further includes:
      a first body in a cylindrical shape;
      a first plate which is connected to the first body and has an annular shape configured to cover an upper surface of the first magnet; and
      a plurality of first coupling protrusions which protrude from an inner circumferential surface of the first body and are coupled to the first rotor core, and
   wherein the first protrusion part protrudes from a bottom surface of the first coupling protrusion in the shaft direction.

2. The rotor of claim 1, wherein the gap is in a range of 0.7 mm to 1.5 mm.

3. The rotor of claim 1, wherein the first protrusion part and the second protrusion part are alternately disposed in a radial direction of the rotor.

4. The rotor of claim 1, wherein the first coupling protrusion includes:
   a coupling part coupled to the outer circumferential surface of the first rotor core; and
   an extension part which connects the coupling part and the first body and fixes the first magnet.

5. The rotor of claim 1, wherein:
   the first protrusion part supports the second magnet, and
   the second protrusion part supports the first magnet.

6. The rotor of claim 1, wherein:
   the first plate includes at least one insertion protrusion to be coupled to an upper surface of the first rotor core, and the insertion protrusion is inserted into a coupling hole formed in the first rotor core.

7. The rotor of claim 1, wherein a distance between the inner circumferential surface and an outer circumferential surface of the first body decreases toward a central position between adjacent first coupling protrusions.

8. The rotor of claim 1, wherein the first coupling protrusion includes a through hole formed from the bottom surface of the first coupling protrusion in the shaft direction.

9. The rotor of claim 1, wherein:
each of the first magnet and the second magnet includes one surface facing the outer circumferential surface of each of the first rotor core and the second rotor core, an opposite surface facing the one surface, and a plurality of side surfaces connecting the one surface and the opposite surface,
each of the plurality of side surfaces includes a first side surface and a second side surface which are parallel to the shaft direction and a third side surface and a fourth side surface which are perpendicular to the shaft direction, and
any one of the first side surface and the second side surface has a curvature.

10. A motor comprising:
a housing;
a stator disposed in the housing;
the rotor according to claim 1; and
a rotating shaft configured to pass through a center of the rotor.

11. The motor of claim 10, wherein the gap is greater than a distance between an outer diameter of the first magnet and an inner circumferential surface of the stator.

12. The motor of claim 10, wherein the first protrusion part and the second protrusion part are alternately disposed in a radial direction of the rotor.

13. The motor of claim 10, wherein the first coupling protrusion includes:
a coupling part coupled to the outer circumferential surface of the first rotor core; and
an extension part which connects the coupling part and the first body and fixes the first magnet.

14. The motor of claim 10, wherein:
the first protrusion part supports the second magnet, and
the second protrusion part supports the first magnet.

15. The motor of claim 10, wherein:
the first plate includes at least one insertion protrusion to be coupled to an upper surface of the first rotor core, and
the insertion protrusion is inserted into a coupling hole formed in the first rotor core.

16. The motor of claim 10, wherein a distance between the inner circumferential surface and an outer circumferential surface of the first body decreases toward a central position between adjacent first coupling protrusions.

17. The motor of claim 10, wherein the first coupling protrusion includes a through hole formed from the bottom surface of the first coupling protrusion in the shaft direction.

18. The motor of claim 10, wherein:
each of the first magnet and the second magnet includes one surface facing the outer circumferential surface of each of the first rotor core and the second rotor core, an opposite surface facing the one surface, and a plurality of side surfaces connecting the one surface and the opposite surface,
each of the plurality of side surfaces includes a first side surface and a second side surface which are parallel to the shaft direction and a third side surface and a fourth side surface which are perpendicular to the shaft direction, and
any one of the first side surface and the second side surface has a curvature.

19. The rotor of claim 1, wherein the first coupling protrusion protrudes in the shaft direction to serve as the first protrusion part, and includes a through hole formed in the bottom surface of the first coupling protrusion.

20. The rotor of claim 1, wherein the first body covers an entire outer circumferential surface of each of the plurality of first magnets.

* * * * *